J. P. BUCKLAND.
Sifting Shovel.
No. 49,370.
Patented Aug. 15, 1865.
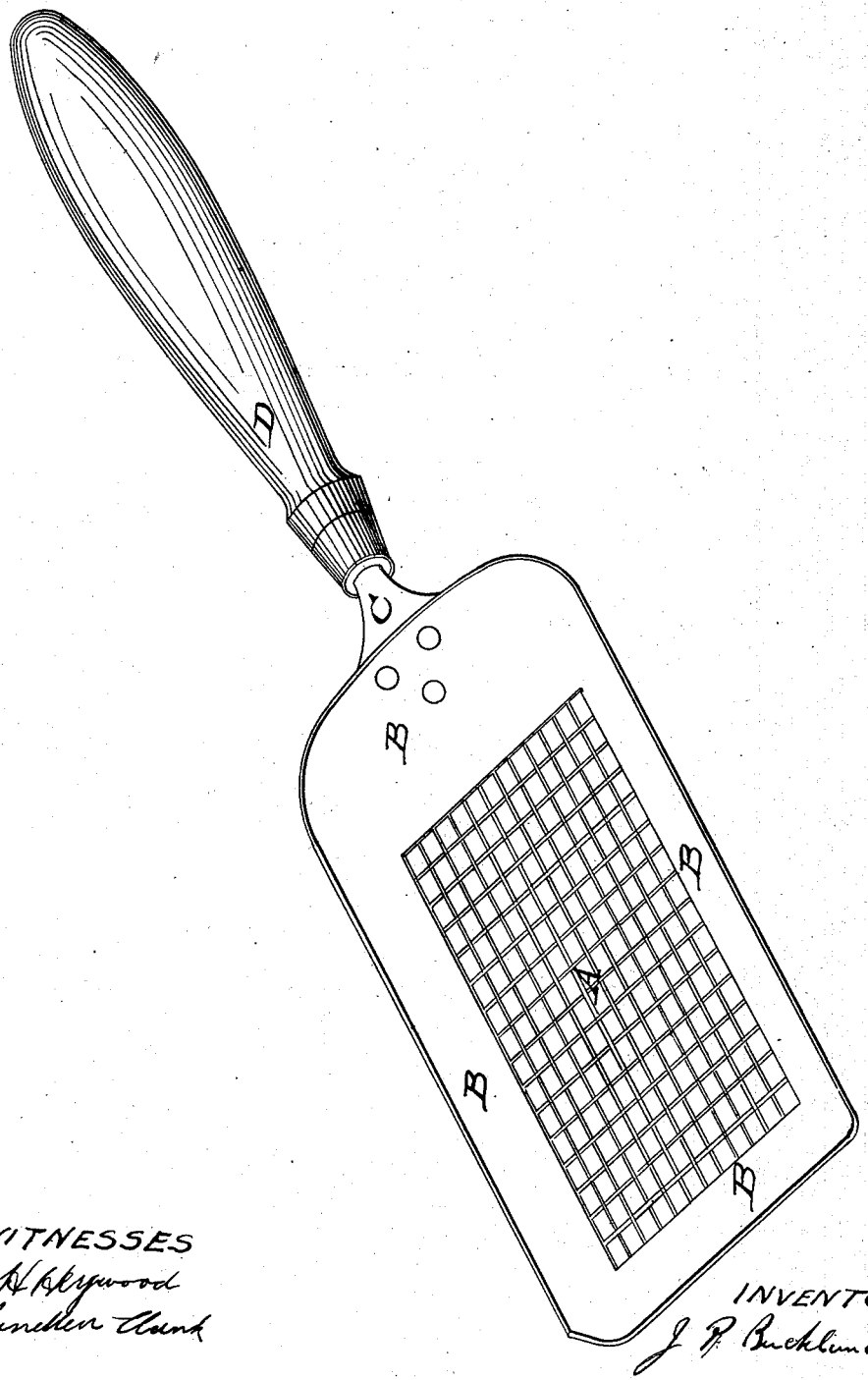

UNITED STATES PATENT OFFICE.

J. P. BUCKLAND, OF HOLYOKE, MASSACHUSETTS.

SIFTING-SHOVEL.

Specification forming part of Letters Patent No. 49,370, dated August 15, 1865.

*To all whom it may concern:*

Be it known that I, J. P. BUCKLAND, of Holyoke, in the county of Hampden and State of Massachusetts, have invented a new and useful Improvement in Sifting-Shovels; and I do hereby declare that the following is a full, clear, and exact description of the construction and operation of the same, reference being had to the annexed drawing, making a part of this specification, and to the letters of reference marked thereon, said drawing being a perspective view of said sifting-shovel.

My invention consists in constructing the bottom of a shovel mainly or entirely of wire-netting, or "wire-cloth," so called, of suitable strength and size of mesh, and this I accomplish by attaching the said wire-netting firmly to a frame or skeleton of metal with a handle attached thereto, so that the frame and attached handle form, in combination with the wire-netting, a sifting-shovel, the frame constituting the sides, rear end, and front edge of the shovel, and the wire-netting constituting the larger portion of the bottom thereof for a sifting-surface.

The construction and operation of my inventions are as follows:

A piece of wire-netting, A, of suitable dimensions is placed in the mold in which the frame B is to be cast in such a position that more or less of the wire-netting will extend into the molten iron when the mold is filled therewith, and upon cooling the frame and netting will be firmly connected, and a durable shovel is produced.

I am aware that the frame may be likewise constructed of wrought or sheet iron, and the wire-netting may be attached thereto by rivets or wires, and have constructed shovels in such a manner, but prefer the method of construction above described, as being cheaper and sufficiently strong for most purposes.

For use in tanneries, chemical works, and some other situations a frame of non-corrosive metal might be used.

By the method of construction above set forth a sifting or screening shovel is produced having the largest possible sifting-surface, and any materials are screened with much greater facility and rapidity than in the sifting-shovels in common use, constructed of perforated sheet-iron or of cast-iron with longitudinal slots therein.

What I claim as my invention, and desire to secure by Letters Patent, is—

The use of wire-netting in the construction of sifting-shovels the frame or skeleton of which is composed of cast-metal.

J. P. BUCKLAND.

Witnesses:
C. H. HEYWOOD,
CHANDLER CLARK.